United States Patent
Ausserlechner (10) Patent No.: US 10,416,001 B2
(45) Date of Patent: Sep. 17, 2019

(54) MAGNET ARRANGEMENT FOR ROTATIONAL ANGLE DETECTION

(71) Applicant: Infineon Technologies AG, Neubiberg (DE)

(72) Inventor: Udo Ausserlechner, Villach (AT)

(73) Assignee: Infineon Technologies AG, Neubiberg (DE)

(*) Notice: Subject to any disclaimer, the term of this patent is extended or adjusted under 35 U.S.C. 154(b) by 202 days.

(21) Appl. No.: 15/687,159

(22) Filed: Aug. 25, 2017

(65) Prior Publication Data

US 2019/0063955 A1   Feb. 28, 2019

(51) Int. Cl.
*G01D 3/08* (2006.01)
*G01D 5/20* (2006.01)
*G01D 5/14* (2006.01)

(52) U.S. Cl.
CPC .......... *G01D 5/2033* (2013.01); *G01D 3/08* (2013.01); *G01D 5/145* (2013.01)

(58) Field of Classification Search
CPC ........ G01D 5/2033; G01D 3/08; G01D 5/145; G01B 7/10; G01B 7/105; G01B 11/10; G01B 21/08; G01B 7/001; G01B 7/003; G01B 7/06
USPC .......... 324/331, 345, 381, 463, 207.25, 210, 324/213, 219, 220–232, 259–263, 529, 324/750.12, 750.21, 754.17, 754.29, 167, 324/179; 73/455, 457, 865.8, 865.9; 702/1, 33, 35, 38, 182, 183, 127, 187, 702/189
See application file for complete search history.

(56) References Cited

U.S. PATENT DOCUMENTS

| | | | | |
|---|---|---|---|---|
| 3,586,048 A | * | 6/1971 | Arnold | F16L 37/004 137/614.04 |
| 3,684,959 A | * | 8/1972 | Spira | G01R 1/16 29/595 |
| 3,735,170 A | * | 5/1973 | Christensen | G01P 3/46 310/219 |
| 4,789,826 A | * | 12/1988 | Willett | G01B 7/30 324/207.2 |
| 5,336,996 A | * | 8/1994 | Rusnak | F04D 13/024 324/165 |
| 5,537,032 A | * | 7/1996 | Hurrell, II | G01P 3/488 324/173 |
| 6,043,643 A | * | 3/2000 | Message | G01P 3/443 324/174 |
| 6,452,383 B1 | | 9/2002 | Goedecke | |
| 8,229,682 B2 | * | 7/2012 | El-Refaie | F16C 19/52 324/263 |

(Continued)

*Primary Examiner* — Jermele M Hollington
*Assistant Examiner* — Taqi R Nasir
(74) *Attorney, Agent, or Firm* — Harrity & Harrity, LLP (57) ABSTRACT

A ring magnet for use in determining a rotational angle of a rotatable shaft and configured to be connected to the rotatable shaft for co-rotation with the rotatable shaft around a rotational axis may include a recess in a circumferential surface of the ring magnet, where the recess may be recessed away from the circumferential surface to cause a magnetic sensor to measure a substantially constant ellipticity of a radial component of a magnetic field of the ring magnet and a tangential component of the magnetic field of the ring magnet, when measuring the rotational angle of the rotatable shaft, as the ring magnet moves along the rotational axis of the rotatable shaft.

20 Claims, 9 Drawing Sheets

(56) References Cited

U.S. PATENT DOCUMENTS

2013/0069643 A1\* 3/2013 Joshi ..................... G01R 33/00
  324/261
2016/0216132 A1 7/2016 Ausserlechner \* cited by examiner

MAGNET ARRANGEMENT FOR ROTATIONAL ANGLE DETECTION

BACKGROUND

A magnetic sensor may be capable of sensing components of a magnetic field applied to the magnetic sensor, such as a magnetic field magnitude, magnetic field intensity, a magnetic field direction (e.g., based on directional components of the magnetic field), and/or the like. The magnetic field of the magnet may depend on a magnetization of the magnet, a shape of the magnet, an environment of the magnet, and/or other factors. The magnetic sensor may be used to detect, for example, movement, position, an angle of rotation, and/or the like, of a magnet, which may be connected to an object, in a variety of applications, such as a mechanical application, an industrial application, or a consumer application.

SUMMARY

According to some implementations, a ring magnet for use in determining a rotational angle of a rotatable shaft and configured to be connected to the rotatable shaft for co-rotation with the rotatable shaft around a rotational axis may include a recess in a circumferential surface of the ring magnet, where the recess may be recessed away from the circumferential surface to cause a magnetic sensor to measure a substantially constant ellipticity of a radial component of a magnetic field of the ring magnet and a tangential component of the magnetic field of the ring magnet, when measuring the rotational angle of the rotatable shaft, as the ring magnet moves along the rotational axis of the rotatable shaft.

According to some implementations, a rotational angle detection system may include a ring magnet for use in determining a rotational angle of a rotatable shaft and configured to be mounted on the rotatable shaft for co-rotation with the rotatable shaft around a rotational axis, where the ring magnet is configured to include a recess in a circumferential surface of the ring magnet, and where the recess is recessed away from the circumferential surface; and/or a magnetic sensor to measure the rotational angle of the rotatable shaft based on a measured ellipticity of a magnetic field of the ring magnet when measuring the rotational angle of the rotatable shaft, the measured ellipticity of the magnetic field of the ring magnet to remain substantially constant, due to the recess, as the ring magnet moves along the rotational axis of the rotatable shaft.

According to some implementations, a magnet arrangement to measure a rotational angle of a rotatable shaft may include a first ring magnet with a first magnetization; a second ring magnet with a second magnetization, where the second magnetization is substantially a same magnetization as the first magnetization; and/or a frame component connected to or formed as a part of the rotatable shaft, where the frame component includes a swashplate situated between the first ring magnet and the second ring magnet, the swashplate in contact with an end face of the first ring magnet and an end face of the second ring magnet to form a recess in the magnet arrangement, where when a magnetic sensor measures an angle of rotation of the rotatable shaft, a constant ellipticity of a magnetic field, caused by the first magnetization and the second magnetization, is measured based on the recess.

DETAILED DESCRIPTION

The following detailed description of example implementations refers to the accompanying drawings. The same reference numbers in different drawings may identify the same or similar elements.

In some magnetic rotational angle detection systems, a magnetic sensor is placed off a rotational axis of a rotatable shaft, rather than at an end of the rotatable shaft. For example, a magnetic sensor may not be placed at an end of a rotatable shaft to determine the rotational angle because the rotatable shaft may be too long to place a sensor at the end of the rotatable shaft, because one or more interfering objects (e.g., a motor, a fan, a gearbox, a pump, and/or the like) may be placed at ends of the rotatable shaft, and/or because other components or design specifications of the rotational angle detection system may require that the magnetic sensor be positioned off the rotational axis of the shaft. In such systems, a standard ring magnet with diametrical magnetization may be connected to or formed as a part of the rotatable shaft and may be aligned with the magnetic sensor with an air gap between the magnetic sensor and the magnet, such that the magnetic sensor may detect the angle of rotation of the rotatable shaft based on a magnetic field of the magnet that is sensed by the magnetic sensor. In such systems, assembly tolerances, wear and tear of parts (e.g., bearings that facilitate rotation of the shaft), mechanical loads on the rotatable shaft (e.g. a torque or axial force), or axial and/or radial play of the rotatable shaft relative to the position of the magnetic sensor may cause the magnet and/or magnetic sensor to become misaligned and/or dimensions of the air gap to change. Such changes may affect the ability of the magnetic sensor to accurately determine a rotational angle associated with rotatable shaft.

Examples described herein provide a system to allow for an accurate determination of a rotational angle of a rotatable shaft regardless of a position of a magnet on the rotatable shaft while the magnet is within a particular range of the magnetic sensor. In some implementations, a magnet (or magnet arrangement) and/or a rotational angle detection system may be provided that allows for a constant measurement (within a tolerance) of one or more components of a magnetic field of a magnet to be measured when the magnet, situated on a rotatable shaft, is within a particular range of the magnetic sensor along the rotational axis of the rotatable shaft. In some implementations, a magnet arrangement may be provided for a rotational angle detection system that includes a magnet arrangement with a frame component to allow for a constant measurement (within a tolerance) of one or more components of a magnetic field of a magnet to be measured when the magnet arrangement, situated on a rotatable shaft, is within a particular range of the magnetic sensor along an axis of rotation of the rotatable shaft.

Figure 1A:
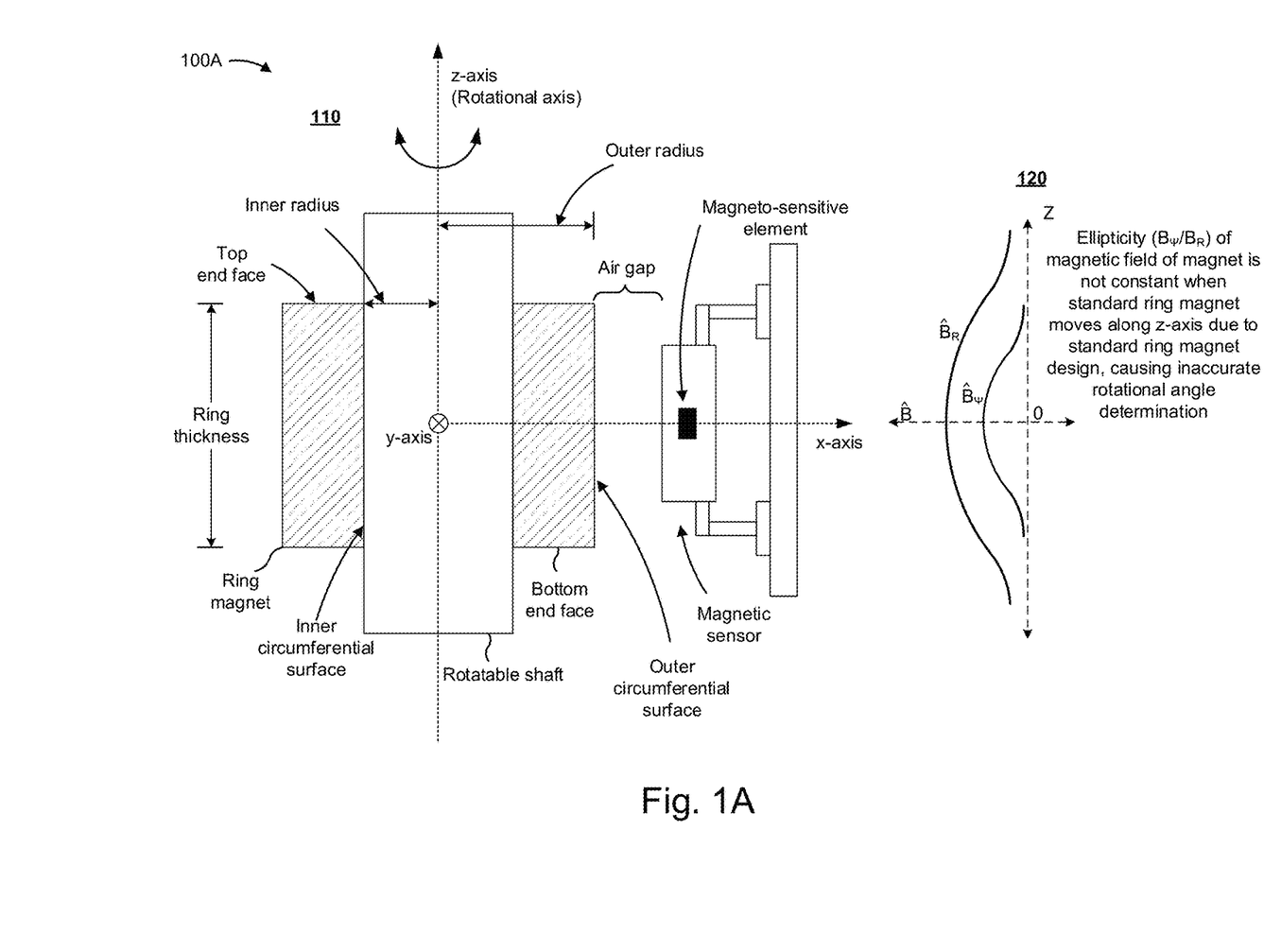
FIGS. 1A-1C are diagrams of an overview of example implementations described herein.
Figure 1B:
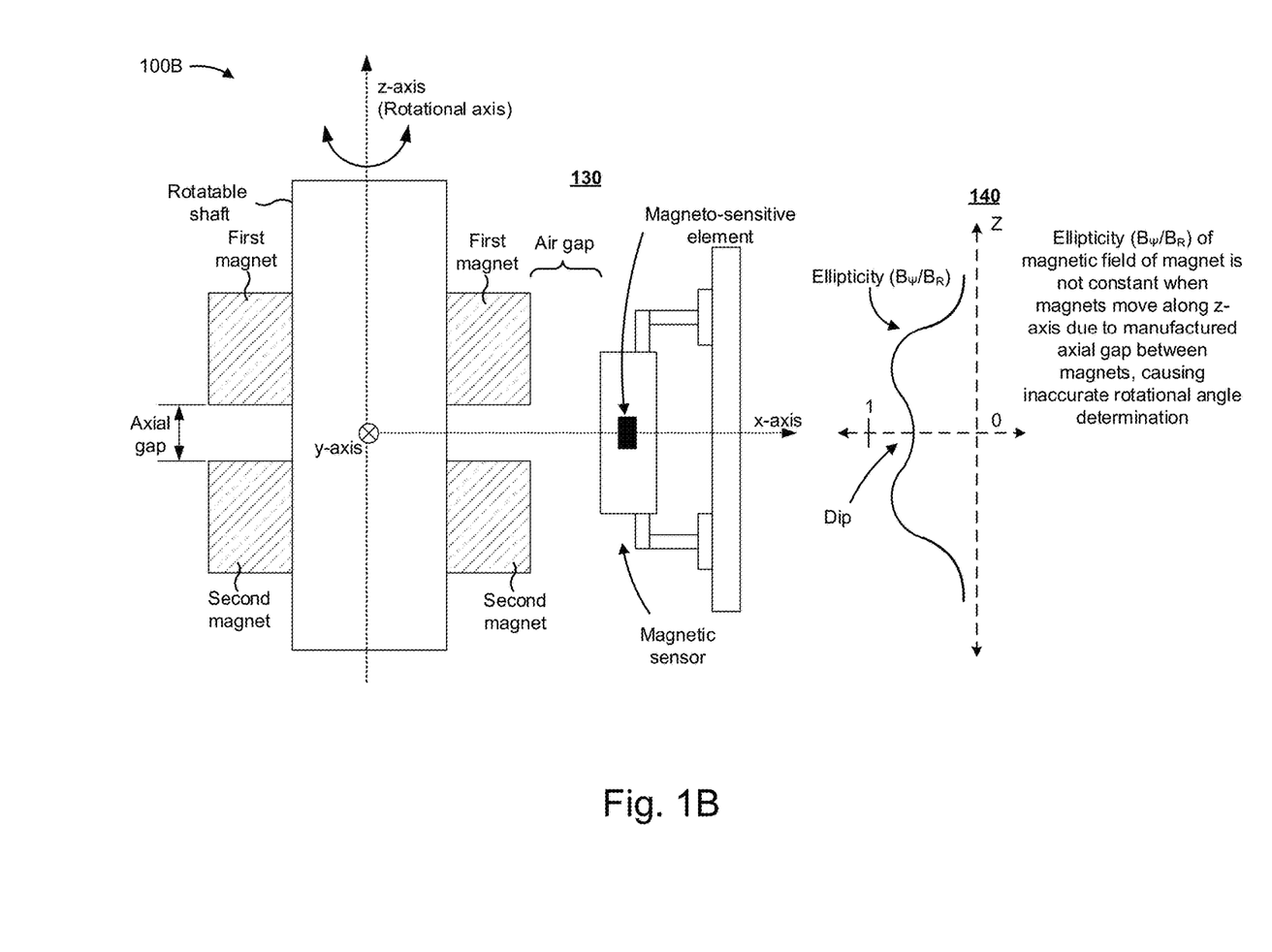
Figure 1C:
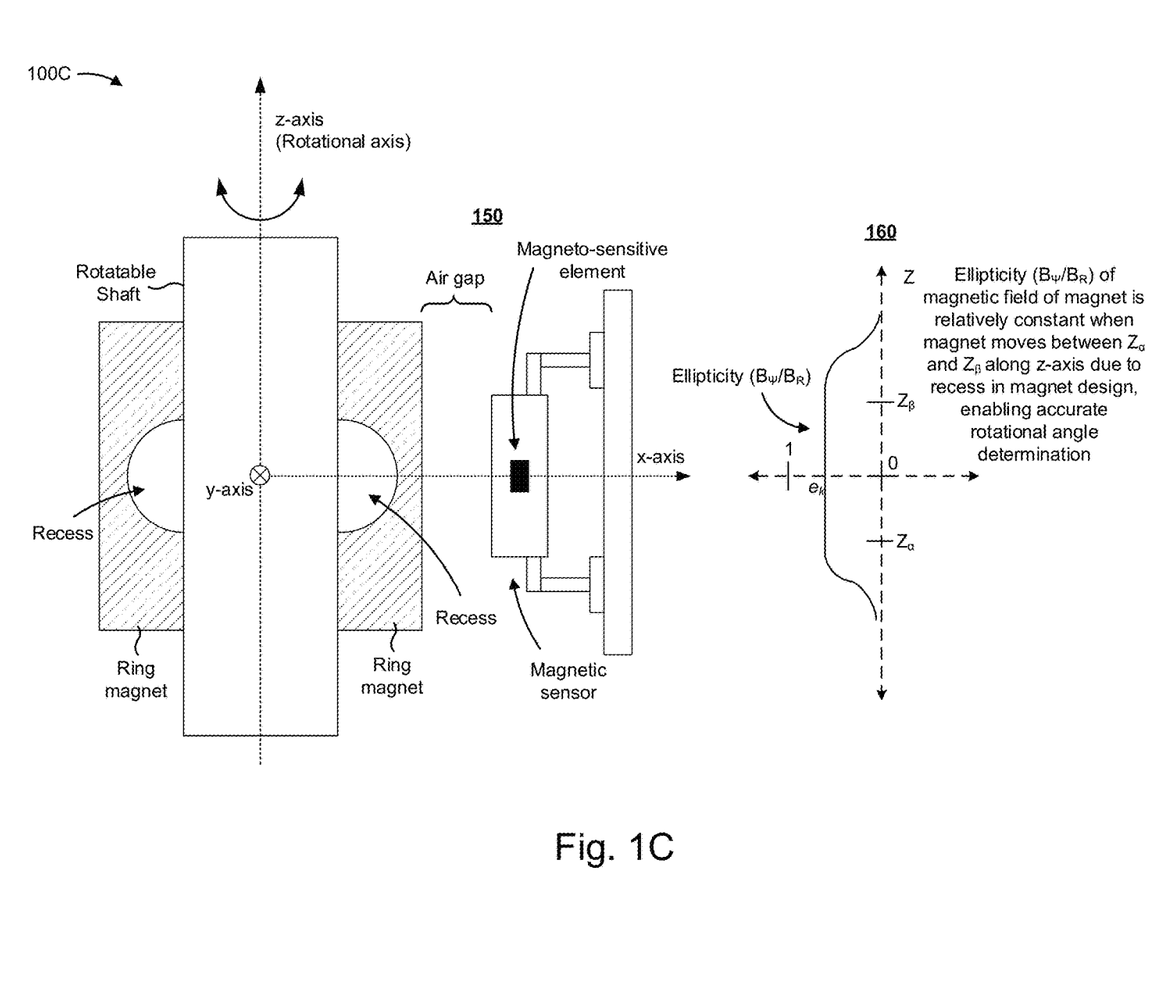

FIGS. 1A-1C are diagrams of an overview of example implementations 100A-100C (which may be collectively referred to as example implementation 100), respectively, described herein. FIGS. 1A-1C illustrate example rotational angle detection systems. As shown in FIGS. 1A-1C, a rotatable shaft includes a magnet arrangement with a particular configuration or design. For example, the magnet arrangement may be diametrically magnetized in a direction of an x-axis and be ring shaped (and/or ellipsoidal). The magnet arrangement may be connected to or may form a part of the rotatable shaft, such that the magnet arrangement may rotate about a rotational axis (which may be referred to herein as the "z-axis") with the rotatable shaft. Accordingly, the magnet arrangement may rotate about the z-axis such that the magnetic field of the magnet, due to the diametric magnetization, rotates through an xy-plane of the x-axis and a y-axis (which is shown as an axis going through the drawings plane and is perpendicular to the z-axis and x-axis). The x-axis, y-axis, and z-axis of FIGS. 1A-1C are perpendicular to one another. Furthermore, in FIGS. 1A-1C, the magnetic sensor, having one or more magneto-sensitive elements, may be aligned with the magnet arrangement. The magnetic sensor may be mounted (e.g., to a printed circuit board, a stator device, and/or the like), such that, in descriptions herein, the magnetic sensor detects a radial component of the magnetic field (e.g., a component relative to the x-axis) and/or a tangential component of the magnetic field (e.g., a component relative to the y-axis). The magnetic sensor may be positioned to measure the radial component and/or the tangential component of the magnetic field. In some implementations, the magnetic sensor may be placed in a symmetry plane of the magnet (e.g., in the xy-plane) to minimize variations in measurements due to movements of the rotatable shaft, magnet, and/or magnetic sensor (e.g., due use, manufacturing tolerances, and/or the like). In FIGS. 1A-1C, an air gap (e.g., about 1 to 4 millimeters (mm)) is present between the magnet and the magnetic sensor. In examples herein, the rotatable shaft, magnet arrangement, and/or other components may be assembled, formed, and/or connected to one another via at least one of an adhesive, injection molding, over molding, and/or the like.

As shown in FIG. 1A, in the example implementation 100A, a standard ring magnet is connected to or formed as a part of the rotatable shaft, as indicated by reference number 110. A standard ring magnet may include an inner circumferential surface, an outer circumferential surface, a first end face (shown as a top end face), and a second end face (shown as a bottom end face). Accordingly, the standard ring magnet may be shaped like a ring, torus, or ellipsoid, such that the standard ring magnet has dimensions including a thickness, an inner radius of the inner circumferential surface and an outer radius of the outer circumferential surface. The example standard ring magnet in FIG. 1A may be connected to or formed as a part of the rotatable shaft along the inner circumferential surface, such that the inner circumferential surface is in contact with the rotatable shaft.

In the example implementation 100A of FIG. 1A, due to the symmetry of the standard ring magnet, the magnetic sensor may not detect a z-component of the magnetic field (e.g., the z-component may be undetectable or be sensed as zero (0)). However, the magnetic sensor may calculate a radial component ($B_R$) and a tangential component ($B_\Psi$) of the magnetic field, which may vary essentially sinusoidally versus a rotational angle of the shaft with a 90 degree phase shift (i.e., the radial component may vanish (may not be measureable by the magnetic sensor) when the tangential component has a positive or negative extreme or vice versa). The extremes of the radial component ($B_R$) and the tangential component ($B_\Psi$) may not necessarily be equally as strong, so a magnetic field vector measured by the magnetic sensor may have an end that moves along an ellipse in the radial-tangential magnetic field plane. An ellipticity (e) of the radial component ($B_R$) and tangential component ($B_\Psi$) of the magnetic field may be calculated from a ratio of the amplitude of the tangential component of the magnetic flux density to the amplitude of the radial component of the magnetic flux density as follows:

$$e = \left|\frac{\hat{B}_\Psi}{\hat{B}_R}\right| \quad \text{Equation (1)}$$

such that with an ellipticity equal to one (e=1), then $\arctan_2 (B_R, B_\Psi)$ is equal to the rotational angle $\varphi$ of the standard ring magnet, but if the ellipticity is different from one (e≠1), then the rotational angle $\varphi$ is a nonlinear function of the $\arctan_2 (B_R, B_\Psi)$ (i.e., $\varphi = f(\arctan_2 (B_R, \hat{B}_\Psi)) = (x)$, where f(x) is a nonlinear function of a variable (x) of the magnetic sensor in the magnetic field of the standard ring magnet). If the ellipticity is known to the sensor, it may simply compute the rotational angle by $\varphi = f(\arctan_2 (e*B_R, B_\Psi))$. In general, in FIG. 1A, the magnetic sensor may make the above measurements and calculations in any suitable manner, and estimate the rotational angle $\varphi$ with the ellipticity being assumed as ellipticity constant $e_k$ based on f(x), which is known due to the known configuration (e.g., geometrical/physical configuration, magnetic configuration, and/or the like) of the rotational angle detection system of example implementation 100A. Notably, although some examples herein describe ellipticity in the radial-tangential plane (i.e., ellipticity ($B_R, B_\Psi$)), in some implementations, ellipticity in another plane (e.g., z-radial plane and/or z-tangential plane) may be used. For example, with a magnetic sensor not positioned at z=0 (for the standard ring magnet), the magnetic sensor may calculate an ellipticity in the z-radial plane and/or the z-tangential plane.

However, in FIG. 1A, a configuration of the rotational angle detection system may change. For example, the position of the standard ring magnet and/or the position of the magnetic sensor may change relative to one another (e.g., due to assembly tolerances, due to wear and tear of parts (e.g., bearings that facilitate rotation of the shaft), due to mechanical loads on the rotatable shaft (e.g. a torque or axial force), or due to axial and/or radial play of the rotatable shaft). Such a change in the configuration may change f(x) and/or a change in the ellipticity, such that ellipticity is not equal to the ellipticity constant $e_k$.

In FIG. 1A, a plot of an amplitude of a radial component and an amplitude of a tangential (or azimuthal) component of the magnetic field (e.g., a radial component of the magnetic flux density and an tangential component of the magnetic flux density) of the standard ring magnet as the standard ring magnet (and, correspondingly, the rotatable shaft) moves linearly (e.g., up or down as shown in FIG. 1A) along the z-axis is provided, as shown by reference number 120. As illustrated by the plot, the ellipticity of the magnetic field may not equal the ellipticity constant $e_k$ when the standard ring magnet moves along the z-axis due to standard ring magnet design, causing inaccurate rotational angle determination by the rotational angle detection system of example implementation 100A.

According to some implementations, a magnet (or magnet arrangement) and/or a rotational angle detection system may be provided to ensure the ellipticity (of the magnetic field remains relatively equal to ellipticity constant $e_k$ as a configuration of the rotational angle detection system changes (e.g., within a tolerance of linear movement of the rotatable shaft in the z-direction). Accordingly, the magnet arrangement and/or rotational angle detection system may allow for robustness, enabling a magnetic sensor to make an accurate determination of a rotational angle of a rotatable shaft regardless of the position of the magnet relative to the magnetic sensor (within a tolerance range, such as $z_\alpha < z < z_\beta$).

As shown, FIG. 1B, in the example implementation 100B, a rotational angle detection system may include a magnet arrangement with an axial gap between a pair of ring magnets (e.g., which may correspond to the standard ring magnets of FIG. 1A) to determine a rotational angle of a rotatable shaft, as indicated by reference number 130. In the example implementation 100B, the axial gap may increase an ability to maintain constant ellipticity relative to the rotational angle detection system of example implementation 100A. As shown in FIG. 1B and by reference number 140, a plot of the ellipticity of the radial component and tangential component of the magnetic field shows a relatively constant measurement of the ellipticity, indicating ellipticity measurements may be near ellipticity constant $e_k$. However, as indicated in FIG. 1B, depending on the size of the axial gap, a relatively large dip (around z=0) may be measured in the ellipticity. In some implementations, manufacturing limitations and/or capabilities may not allow for the axial gap to be small enough to effectively eliminate (or at least lessen) the size of the dip in the ellipticity. Additionally, in such implementations, for some magnetic sensors, the magnets of the magnet arrangement may need to be situated on the rotatable shaft such that the magnets have a same (within a tolerance) direction of magnetization. Such a configuration may be difficult to achieve considering tolerances of manufacturing. As such, the ellipticity ($B_R/B_\Psi$) of the magnetic field may not equal ellipticity constant $e_k$ when the magnet arrangement of example implementation 100B moves along the z-axis due to the manufactured axial gap between the pair of magnets and/or difference in magnetization between the pair of magnets. Accordingly, in some implementations, inaccurate rotational angle determinations may be made if there is a change in a configuration of the rotational angle detection system of FIG. 1B.

In some implementations, the axial gap may be filled with a permanent magnetic material that has a weaker magnetization than the first and second magnets (e.g., about 50% of the first and second magnets). In such cases, filling the gap with a weak permanent magnet may reduce the effect of the gap, and thus, the dip in the ellipticity. Accordingly, rather than leaving an axial gap, the gap may be filled with a weakened magnet (e.g., through a molding process) to address the deficiencies of example implementation 100B.

According to some implementations, a magnet and/or a rotational angle detection system may be provided to lessen or minimize a dip in ellipticity (e.g., the dip in ellipticity of example implementation 100B) and achieve a relatively constant measurement of ellipticity of the magnetic field as a configuration of the rotational angle detection system changes (i.e., ellipticity may equal ellipticity constant $e_k$ as the configuration changes). Such implementations may allow for an accurate determination of a rotational angle of a rotatable shaft regardless of the position of the magnet relative to the magnetic sensor.

As shown in FIG. 1C, in the example implementation 100C, a rotational angle detection system may include a magnet (or magnet arrangement) with a recess to determine a rotational angle of a rotatable shaft, as indicated by reference number 150. As shown in FIG. 1C, a base of the recess may have a radius (e.g., a distance from the base to the z-axis) that is greater than the inner radius (e.g., an inner bore) of the ring magnet and less than the outer radius (e.g., a perimeter) of the ring magnet. In some implementations, the recess in the example implementation 100C may be a gas (e.g., such as ambient air), a non-magnetic material (e.g., a dielectric, such as plastic, non-magnetic steel, glue, epoxy, and/or the like). It is also possible to fill the recess with a permanent magnetic material, which has significantly weaker magnetization than the ring magnet. As shown in FIG. 1C, the recess is semicircular and is recessed away from (e.g., within, or inward from) the inner circumferential surface of the ring magnet. In some implementations, the recess may be formed by combining two or more magnets (e.g., such that the ring magnet may include a top half and a bottom half that are connected to one another to form the ring magnet), with at least a portion of the recess notched into at least one of the two or more magnets. In this case, the two or more magnets may be magnetized after the magnets are connected to one another to ensure that the magnets have a same magnetization and act as a single magnet.

In the example implementation 100C, the recess may increase (e.g., relative to the rotational angle detection systems of example implementations 100A, 100B) an ability for ellipticity to remain equal to ellipticity constant $e_k$ regardless of the rotatable shaft in position z on the z-axis. As shown in FIG. 1C, and by reference number 160, a plot of the ellipticity ($/B_\Psi/B_R$) shows a relatively constant measurement of the ellipticity (i.e., ellipticity is equal to ellipticity constant $e_k$). Accordingly, the ellipticity may be relatively constant when the magnet moves between a first position $z_\alpha$ and a second position $z_\beta$ along the z-axis due to the recess in the magnet, thus enabling accurate rotational angle determination when the magnet (and correspondingly the rotatable shaft) is at position z within a tolerance range of $z_\alpha < z < z_\beta$. Additionally, in some implementations, the magnet arrangement in example implementation 100C may be stronger than the magnet arrangement in example implementation 100B.

As indicated above, FIGS. 1A-1C are provided merely as examples. Other examples are possible and may differ from what was described with regard to FIGS. 1A-1C.

Figure 2A:
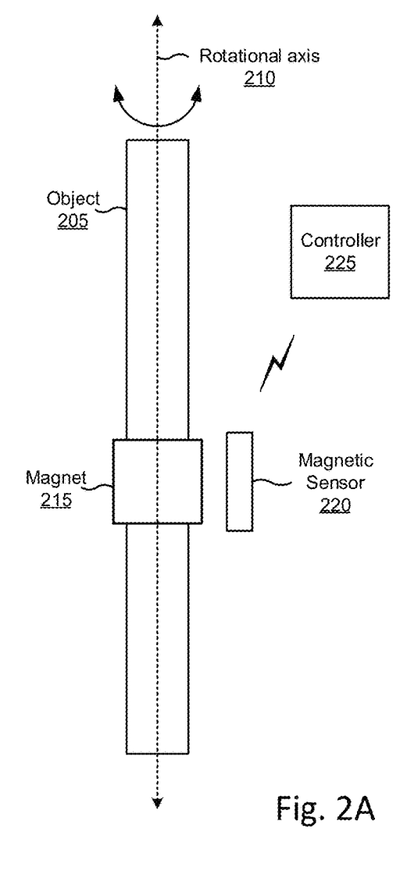
FIGS. 2A-2B are diagrams of an example environment in which magnet arrangements and/or systems for rotational angle detection, described herein, may be implemented.

FIG. 2A is a diagram of an example environment 200 in which magnets, magnetic assemblies, and/or systems described herein may be implemented. As shown in FIG. 2A, environment 200 may include an object 205 (which corresponds to the rotatable shaft of FIGS. 1A-1C) that may be positioned with respect to rotational axis 210 (which may be referred to herein as a "z-axis") a magnet 215 (which may correspond to the magnet or magnet arrangement of FIGS. 1A-1C) connected to object 205, a magnetic sensor 220 (which may correspond to the magnetic sensor of FIGS. 1A-1C), and a controller 225.

Object 205 is an object for which a rotational angle, a position, and/or the like is of interest for a given application. For example, object 205 may be a part of a mechanical system of a machine (e.g., a vehicle, a manufacturing machine, an industrial machine, an agricultural machine, and/or the like). In some implementations, object 205 is capable of rotating about rotational axis 210. In some implementations, object 205 is cylindrical. In such implementations, the radius of object 205 may be approximately 4 mm. Object 205 may be relatively long and/or both ends of object 205 may not be available for magnetic angle sensing or detection, as described above. Accordingly, magnetic sensor 220 may be positioned off rotational axis 210 to detect magnetic field of magnet 215 as it rotates about rotational axis 210.

In some implementations, object 205 is connected to (e.g., attached to, coupled with, affixed to, embedded in, formed as a part of, and/or the like) magnet 215. Example object 205 may be mostly ferrous (e.g., a material with magnetic permeability ($\mu r$)>700, a martensitic stainless steel, a mild steel, and/or the like) and/or a non-magnetic material (e.g., $0.9<\mu r<1.5$, such as aluminum, brass, bronze, copper, plastic, austenitic stainless steel, and/or the like).

Magnet 215 includes a magnet that is connected (e.g., attached, adhered, coupled, affixed, fastened, clipped, clamped, and/or the like) to object 205 for co-rotation with the object such that a rotation of magnet 215 corresponds to a rotational angle (or rotational position) of object 205, as described herein. In some implementations, magnet 215 may include a recess or notch in a circumferential surface of the magnet 215.

Figure 2B:
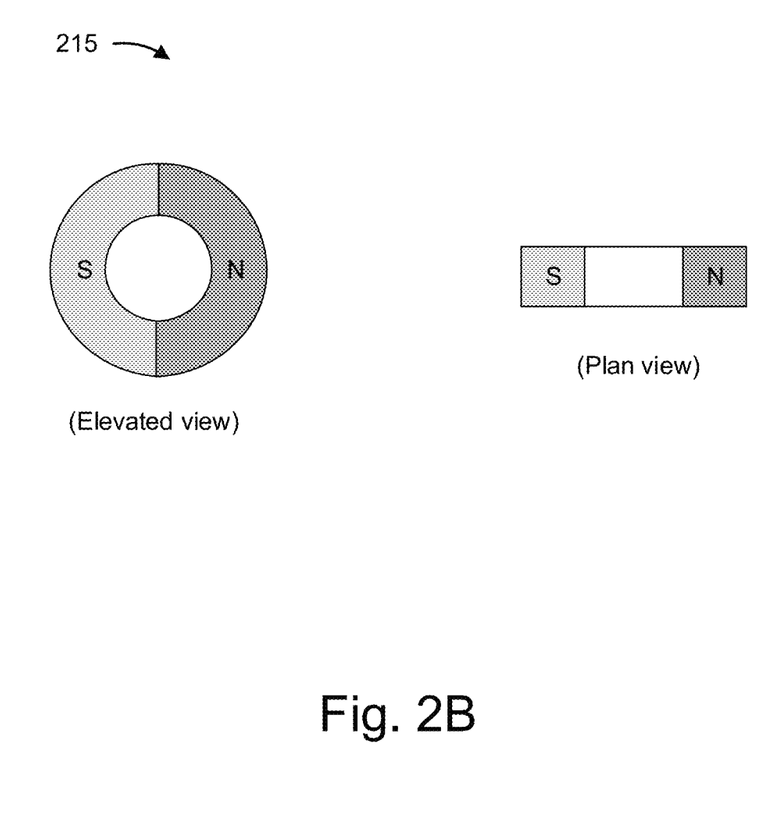

In some implementations, as shown in FIG. 2B, magnet 215 may be diametrically magnetized. As shown in FIG. 2B, magnet 215 includes a first half forming a north pole (N) and a second half forming a south pole (S), such that magnet 215 comprises one pole pair. In some implementations, magnet 215 may, without limitation, comprise more than one pole pair. Additionally, or alternatively, magnet 215 may include a dipole magnet, a permanent magnet, an electromagnet, a magnetic tape, an axially magnetized magnet, and/or the like.

In some implementations, magnet 215 may be comprised of a ferromagnetic material (e.g., Hard Ferrite), and may produce a magnetic field. In some implementations, magnet 215 may further comprise a rare earth magnet, which may be of advantage due to an intrinsically high magnetic field strength of rare earth magnets.

In some implementations, a dimension of magnet 215 (e.g., a length, a width, a height, a diameter, a radius, and/or the like) may be in a range from approximately 1 millimeter (mm) to approximately 15 mm, such as 8 mm. Magnet 215 may be a ring magnet with a recess and object 205 may be cylindrical. As a particular example, magnet 215 may have a thickness or height of approximately 8 mm, an inner radius of approximately 4 mm, and an outer radius of approximately 8 mm (i.e., magnet 215 may be a 8 mm height×4 mm inner radius×8 mm outer radius ring magnet). In some implementations, magnet 215 may include a recess or notch in a circumferential surface of the magnet that is less than 1 mm wide and/or deep. Notably, while magnet 215 may be primarily described as a ring magnet (or a ring magnet with a recess) according to example implementations herein, magnet 215 may have another shape, such as a cubical shape, a cylindrical shape, an ellipsoidal shape, a triangular shape, a polygonal shape, and/or the like.

In some implementations, magnet 215 may be connected to object 205 in an asymmetric manner. For example, a center axis of magnet 215 may not align with rotational axis 210. Although magnet 215 is shown with sharp edges/corners, edges and/or corners of magnet 215 may be rounded.

Magnetic sensor 220 of FIG. 2A includes one or more apparatuses for sensing one or more components of a magnetic field of magnet 215 for use in determining a rotational angle (and/or position) of object 205 (e.g., based on a position of magnet 215 relative to magnetic sensor 220). For example, magnetic sensor 220 may include one or more circuits (e.g., one or more integrated circuits) that operate to sense a set of components (e.g., a z-component, a radial component, and a tangential component) of the magnetic field produced by magnet 215. According to some implementations, a set of components may include one or more of an intensity of a magnetic field (e.g., a magnetic flux density and/or a magnetic field strength), a magnetic field magnitude, a magnetic field direction, or the like.

Magnetic sensor 220 may be a three dimensional (3D) magnetic sensor capable of sensing three directional components of a magnetic field (e.g., a radial component, a tangential component, and an axial component (which may be referred to herein as a "z-component"). In some implementations, magnetic sensor 220 may include an integrated circuit that includes an integrated controller 225 (e.g., such that an output of magnetic sensor 220 may include information that describes a position of magnet 215 and/or a position of object 205). In some implementations, magnetic sensor 220 may include one or more sensing elements (e.g., which may correspond to the magneto-sensitive element of FIGS. 1A-1C) configured to sense the set of components of the magnetic field produced by magnet 215. For example, the sensing element may include a Hall-based sensing element that operates based on a Hall-effect. As another example, the sensing element may include a magnetoresistive based (MR-based) sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element may operate based on an anisotropic magnetoresistance (AMR) effect, a giant magnetoresistance (GMR) effect, a tunnel magnetoresistance (TMR) effect, and/or the like. As an additional example, a sensing element of magnetic sensor 220 may include a variable reluctance (VR) based sensing element that operates based on induction. In some implementations, magnetic sensor 220 may include an analog-to-digital converter (ADC) to convert analog signal received from the sensing elements into digital signals to be processed (e.g., by a digital signal processor (DSP)) by magnetic sensor 220.

In some implementations, magnetic sensor 220 may be arranged at a position relative to magnet 215 such that magnetic sensor 220 may detect components of a magnetic field produced by magnet 215. For example, as shown in FIG. 2A, magnetic sensor 220 may be arranged such that magnetic sensor 220 is a particular distance from the rotational axis 210, such that an air gap (e.g., about 1.3 mm gap) may be present between magnetic sensor 220 and magnet 215 when magnet 215 rotates about rotational axis 210 near magnetic sensor 220. In some implementations, magnetic sensor 220 may be situated on a measurement axis (e.g., which may be referred to herein as the x-axis) that is perpendicular to rotational axis 210

In some implementations, magnetic sensor 220 may be configured with mapping information associated with determining the rotational angle of object 205 based on the sensed set of components of the magnetic field. Magnetic sensor 220 may store the mapping information in a memory element (e.g., a read only memory (ROM) (e.g., an electrically erasable programmable read-only memory (EEPROM)), a random access memory (RAM), and/or another type of dynamic or static storage device (e.g., a flash memory, a magnetic memory, an optical memory, etc.)) of magnetic sensor 220. The mapping information may include information associated with a rotational angle and a set of components of the magnetic field corresponding to the rotational angle. The mapping information may include such information for multiple rotational angles and/or positions of object 205. In some implementations, magnetic sensor 220 may be configured with the mapping information during a manufacturing process associated with magnetic sensor 220 and/or a rotational angle detection system, a calibration process associated with magnetic sensor 220, a setup process associated with magnetic sensor 220, and/or the like.

During operation, magnetic sensor 220 may sense the set of components of the magnetic field of magnet 215. Magnetic sensor 220 may then compare the sensed set of components of the magnetic field to the mapping information, and determine the rotational angle of object 205 based on the comparison. For example, magnetic sensor 220 may identify sets of components of the magnetic field, included in the mapping information, that match (e.g., within a threshold or that satisfy a matching threshold) the sensed set of components of the magnetic field (e.g., an amplitude of the radial component of the magnetic field (e.g., a radial component of the magnetic flux density), an amplitude of a tangential component of the magnetic field (e.g., a tangential component of the magnetic flux density)). In this example, magnetic sensor 220 may determine the rotational angle of object 205 as the rotational angle corresponding to the matched mapping information.

Controller 225 includes one or more circuits associated with determining a rotational angle (and/or position) of object 205, and providing information associated with the rotational angle of object 205. For example, controller 225 may include one or more circuits (e.g., an integrated circuit, a control circuit, a feedback circuit, etc.). Controller 225 may receive input signals from one or more sensors (e.g., from a digital signal processor (DSP) of magnetic sensor 220), such as one or more magnetic sensors 220, may process the input signals (e.g., using an analog signal processor, a digital signal processor, etc.) to generate an output signal, and may provide the output signal to one or more other devices or systems. For example, controller 225 may receive one or more input signals from magnetic sensor 220, and may use the one or more input signals to generate an output signal comprising the rotational angle (or position) of object 205 to which magnet 215 is connected.

The number and arrangement of apparatuses shown in FIGS. 2A and 2B are provided as an example. In practice, there may be additional apparatuses, fewer apparatuses, different apparatuses, or differently arranged apparatuses than those shown in FIGS. 2A and 2B. Furthermore, two or more apparatuses shown in FIGS. 2A and 2B may be implemented within a single apparatus, or a single apparatus shown in FIGS. 2A and 2B may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
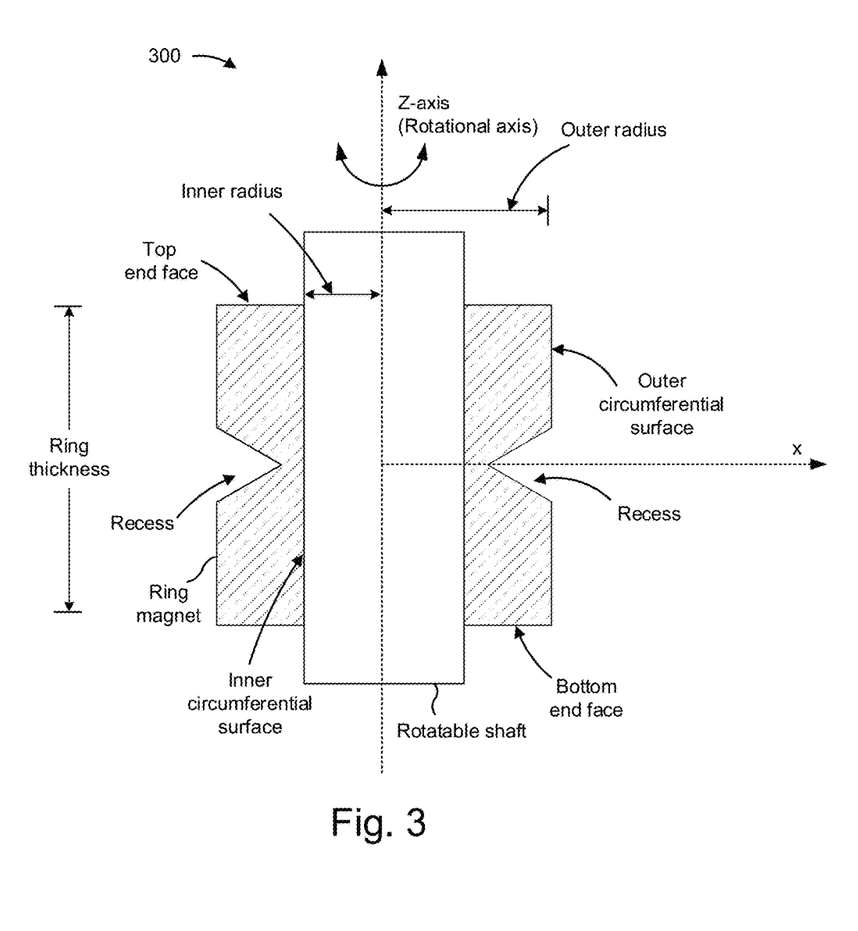
FIGS. 3-6 are diagrams associated with example implementations of a magnet arrangements described herein.

FIG. 3 is a diagram associated with an example implementation 300 of a magnet arrangement described herein. In FIG. 3, references in common with FIGS. 1A-1C identify the same or similar elements. For example, example implementation 300 may include a rotatable shaft, a ring magnet (with an inner circumferential surface, an outer circumferential surface, a top end face, a bottom end face, an inner radius, and an outer radius), and a z-axis (rotational axis). The example implementation 300 of FIG. 3 includes a ring magnet with a recess (e.g., a recess that corresponds to the recess of FIG. 1C). In FIG. 3, the recess is triangular and is recessed away from the outer circumferential surface of the ring magnet.

In some implementations, the recess may include a rotationally uniform (e.g., rotationally symmetric) shape, such as a semi-circular shape, a rectangular shape, a u-shaped shape, a truncated v-shaped shape, a polygonal shape, and/or any other suitable shape. Additionally, or alternatively, the recess may be positioned on the inner circumferential surface of the ring magnet (see FIG. 1C). As shown in FIG. 3, the recess is positioned in a center of the thickness of the ring magnet. In some implementations, the recess may be off-center from the ring magnet. As shown in FIG. 3, the recess has rotational symmetry (e.g., the recess is symmetrical relative to a radius of the recess (a distance from the recess to the rotational axis) along the rotational axis) around the outer circumferential surface. In some implementations, the recess may not have rotational symmetry. In some implementations, more than one recess may be included in the ring magnet. In some implementations, the components of the rotational angle detection system may be assembled, formed, and/or connected to one another via at least one of an adhesive, injection molding, over molding, and/or the like, as described later herein.

The example ring magnet with the recess and/or magnet arrangement of FIG. 3 may enable a magnetic sensor to measure a relatively constant ellipticity of a magnetic field of the magnet according to some implementations described herein regardless of a position z (within a range) of the magnet on the z-axis. Furthermore, in some implementations, the magnet arrangement of example implementation 300 may provide ease of assembly and/or formation of the magnet (e.g., relative to the magnet arrangement of FIG. 1C) because the outer circumferential surface of the magnet may be more accessible than an inner circumferential surface (e.g., a machine may more easily etch the recess into the magnet of example implementation 300 than the magnet of example implementation 100C).

As indicated above, FIG. 3 is provided merely as an example. Other examples are possible and may differ from what was described with regard to FIG. 3.

Figure 4:
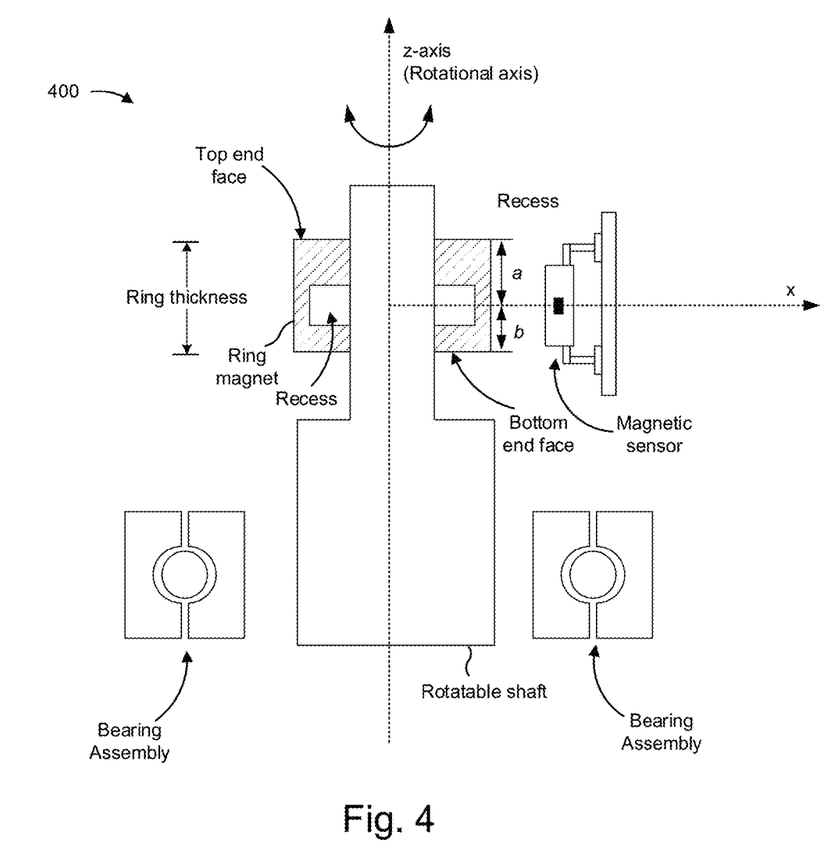

FIG. 4 is a diagram associated with an example implementation 400 of a magnetic sensor arrangement described herein. In FIG. 4, references in common with FIGS. 1A-1C identify the same or similar elements. For example, example implementation 400 may include a rotatable shaft, a ring magnet (with an inner circumferential surface, an outer circumferential surface, a top end face, a bottom end face, an inner radius, and an outer radius), a z-axis (rotational axis), and a magnetic sensor. In example implementation 400 of FIG. 4, the rotatable shaft has a portion with a greater radius than another portion of the rotatable shaft that includes the magnet and includes a bearing assembly. In some implementations, the components of the rotational angle detection system of example implementation 400 may be assembled, formed, and/or connected to one another via at least one of an adhesive, injection molding, over molding, and/or the like.

As shown in FIG. 4, a rectangular recess is added to the ring magnet that is not centered on a thickness (or height) of the magnet to account for any affects that the bearing assembly and/or larger radius of the rotatable shaft may have on the magnetic field of the magnet. For example, the larger radius of the rotatable shaft and/or the bearing assembly may distort a magnetic field of the magnet (e.g., such that the magnetic field is not sensed as symmetrical by the magnetic sensor). Accordingly, the magnet may be designed to account for any potential distortions in the magnetic field of the magnet. As shown, a height a from the top of the end face of the magnet to the center of the recess (which is along the x-axis) in the magnet may be greater than a height b from the bottom end face of the magnet to the center of the recess (which is along the x-axis).

Accordingly, a recess location in the magnet and/or configuration of a magnet arrangement may be designed to achieve a relatively constant ellipticity, according to implementations described herein, based on particular applications that are to use the magnet arrangement described herein.

As indicated above, FIG. 4 is provided merely as an example. Other examples are possible and may differ from what was described with regard to FIG. 4.

Figure 5:
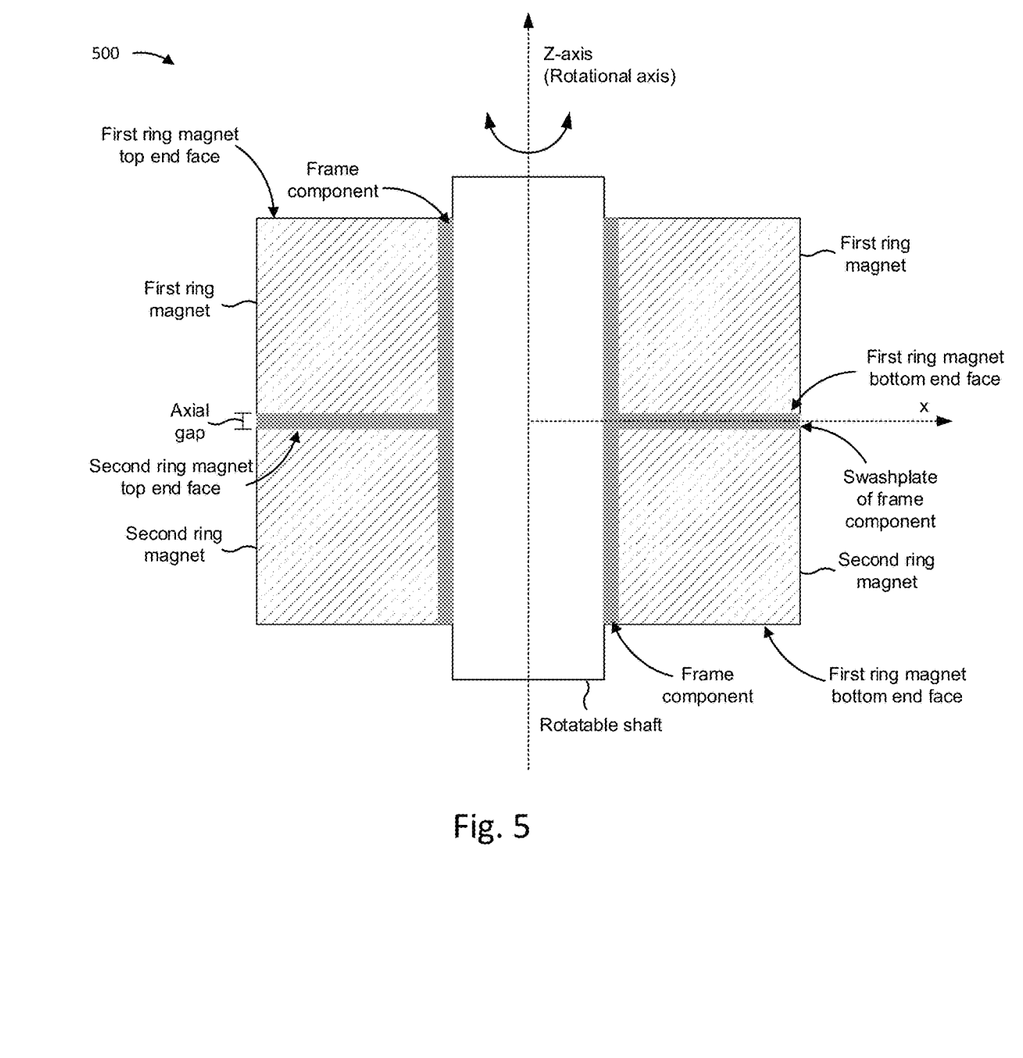

FIG. 5 is a diagram associated with an example implementation 500 of a magnet arrangement described herein. In FIG. 5, references in common with FIG. 1B identify the same or similar elements. For example, example implementation 500 may include a rotatable shaft, a magnet arrangement with an axial gap between a pair of ring magnets (first ring magnet and second ring magnet, which may correspond to the ring magnets of FIGS. 1A-1C, 3, and/or 4), and a z-axis (rotational axis). Example implementation 500 of FIG. 5 includes a frame component connected to or assembled as part of the rotatable shaft with the pair of magnets connected to the frame component.

In some implementations, the first magnet and the second magnet may have a same magnetization, such that a direction of the magnetic field of the first magnet and the second magnet are substantially the same (e.g., within a threshold). In some implementations, radial dimensions of the first magnet and second magnet may be the same or substantially the same. For example, the inner radius and the outer radius of the first magnet may be the same or substantially the same as the inner radius and outer radius of the second magnet, respectively. In some implementations, the first magnet and the second magnet may be assembled or formed with the frame component and/or the rotatable shaft prior to magnetizing the magnets (which may be performed simultaneously) to ensure that the first magnet and the second magnet have the same magnetization.

The example frame component of example implementation 500 of FIG. 5 may include a swashplate situated between the first ring magnet and the second ring magnet. For example, the swashplate may be connected to an end face of the first ring magnet (e.g., a bottom end face of the first ring magnet) and an end face of the second ring magnet (e.g., a top end face of the second ring magnet). In some implementations, the swashplate may be formed as a same material as the frame component. In some implementations, the frame component may be designed and/or manufactured to enable a magnet arrangement with an appropriately sized axial gap (e.g., less than 1 mm) to be accurately assembled or formed. For example, the frame component may allow for an assembly process to create the axial gap to be small enough to prevent the dip in ellipticity described in connection with FIG. 1B, by assembling the frame component swashplate to a thickness corresponding to the size of the axial gap. Accordingly, the frame component may provide a magnet arrangement in a rotational angle detection system to allow a magnetic sensor to measure a relatively constant ellipticity of a magnetic field of the magnet according to some implementations described herein regardless of a position z (within a range) of the magnet arrangement on the z-axis.

In some implementations, the components of the rotational angle detection system of the example implementation 500 may be assembled, formed, and/or connected to one another via at least one of an adhesive, injection molding, over molding, and/or the like.

As indicated above, FIG. 5 is provided merely as an example. Other examples are possible and may differ from what was described with regard to FIG. 5.

Figure 6:
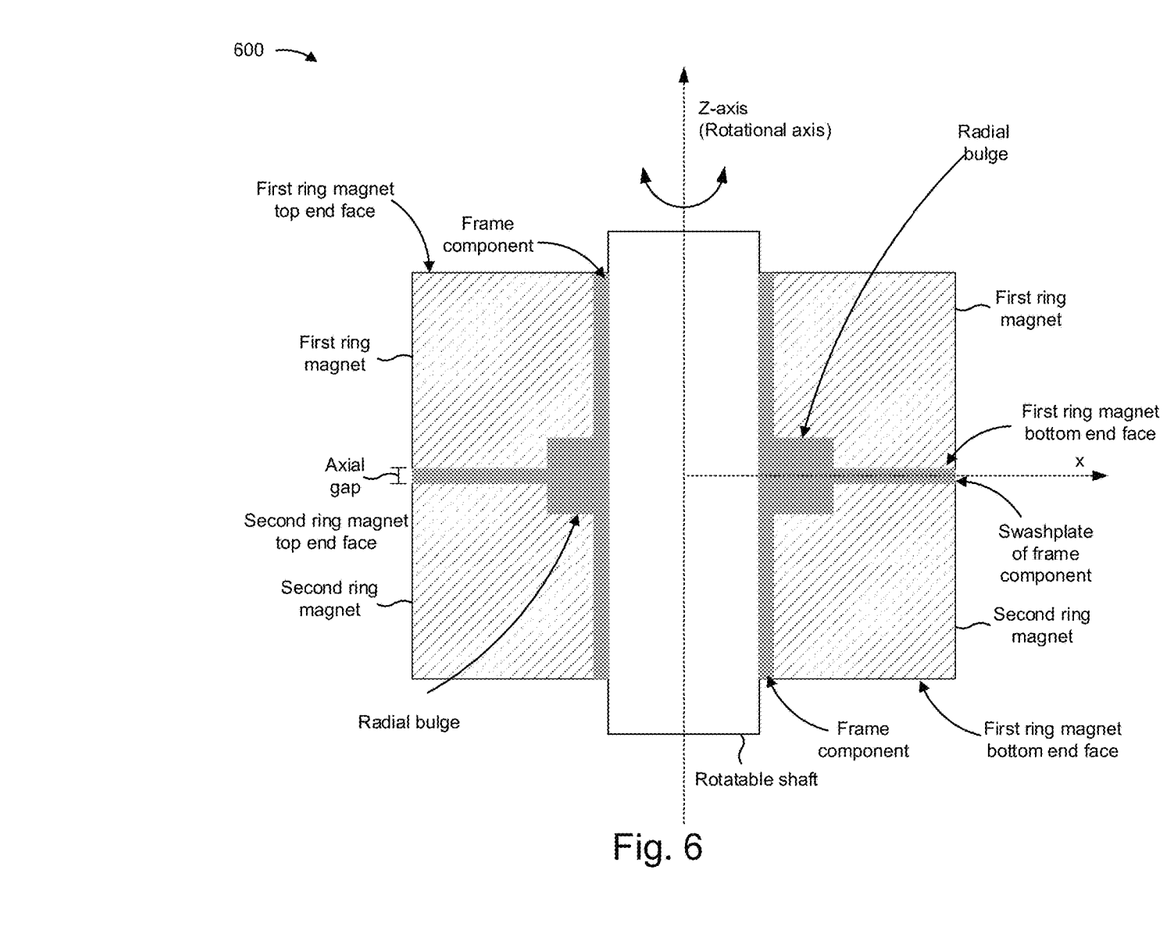

FIG. 6 is associated with an example implementation 600 of a magnet arrangement described herein. In FIG. 6, references in common with FIG. 5 identify the same or similar elements. For example, example implementation 600 may include a rotatable shaft, a magnet arrangement with an axial gap between a pair of ring magnets (first ring magnet and second ring magnet, which may correspond to the ring magnets of FIGS. 1A-1C, 3, 4, and/or 5), and a z-axis (rotational axis). The pair of ring magnets may have the same or similar magnetization as described above in connection with FIG. 5. The example implementation 600 of FIG. 6 includes a frame component, with a radial bulge, connected to or assembled as part of the rotatable shaft with the pair of magnets connected to the frame component (similar to example implementation 500 of FIG. 5). The example radial bulge may serve as a recess, similar to some implementations herein, such that the radial bulge may cause a magnetic sensor to measure a constant ellipticity as the magnets and/or rotatable shaft move along the z-axis. Additionally, or alternatively, the swashplate part of the frame component may be absent (i.e., first and second ring magnets may be fused together to a single unitary part). The radial bulge may have the additional advantage of mechanically anchoring the magnet to the frame structure. If, for example, the magnet is manufactured by injection molding, the frame component with the radial bulge may be inserted into the mold tool prior to the injection and the magnet may be injected around the frame component and radial bulge, such that the magnet and frame cannot be loosened any more. Moreover, in some implementations, the frame component and the radial bulge may be manufactured from a thin walled cylindrical sleeve, whereas the radial bulge may be manufactured by pushing or pressure forming.

In FIG. 6, in some implementations, the radial bulge may be attached to or formed as part of the frame component (e.g., on a swashplate of the frame component). Therefore, the radial bulge may be formed as a same or different material as the frame component. The example radial bulge of the example implementation 600 may be a rotationally uniform shape, similar to the recess described above. In some implementations, the radial bulge may be placed inward on the swashplate toward an inner circumferential surface of the ring magnets, within the inner radius and outer radius of the first and second ring magnets, and/or on the outer edge of the swashplate toward an outer circumferential surface of the ring magnets. Accordingly, the radial bulge may be configured to be located anywhere along the swashplate of the frame component in the example implementation 600 of FIG. 6. In some implementations, the components of the rotational angle detection system of the example implementation 600 may be assembled, formed, and/or connected to one another via at least one of an adhesive, injection molding, over molding, and/or the like.

As indicated above, FIG. 6 is provided merely as an example. Other examples are possible and may differ from what was described with regard to FIG. 6.

Implementations described herein provide a magnet (and/or a magnet arrangement) on a rotatable shaft of a rotational angle detection system that causes a magnetic sensor to measure a relatively constant ellipticity as the rotatable shaft and/or the magnet moves in a direction z along a rotational axis of the rotatable shaft. With the ellipticity being constant, a magnetic sensor may continue to make a relatively accurate determination of a rotational angle of the rotatable shaft despite a change in configuration of the rotational angle detection system (e.g., if the magnet, magnet arrangement, rotatable shaft, magnetic sensor, etc. shift or move during operation). As such, some implementations herein provide robust measurement of an angle of rotation over previous techniques.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A ring magnet for use in determining a rotational angle of a rotatable shaft, the ring magnet configured to be connected to the rotatable shaft for co-rotation with the rotatable shaft around a rotational axis, the ring magnet comprising:
   a recess in a circumferential surface of the ring magnet,
      where the recess is recessed away from the circumferential surface to cause a magnetic sensor to measure a substantially constant ellipticity of a radial component of a magnetic field of the ring magnet and a tangential component of the magnetic field of the ring magnet, when measuring the rotational angle of the rotatable shaft, as the ring magnet moves along the rotational axis of the rotatable shaft.

2. The ring magnet of claim 1, where the circumferential surface is an inner circumferential surface of the ring magnet.

3. The ring magnet of claim 1, where the circumferential surface is an outer circumferential surface of the ring magnet.

4. The ring magnet of claim 1, where the recess comprises a rotationally uniform shape.

5. The ring magnet of claim 1, where the magnetic sensor is situated on a measurement axis perpendicular to the rotational axis, and where the magnetic sensor is configured to measure a constant ellipticity as the ring magnet moves along the rotational axis within a range of the measurement axis.

6. The ring magnet of claim 1, where the recess is configured to be substantially centered on the circumferential surface between a first end face of the ring magnet and a second end face of the ring magnet.

7. The ring magnet of claim 1, where the recess is configured to be closer to a first end face of the ring magnet on the circumferential surface than a second end face of the ring magnet.

8. The ring magnet of claim 1, where a radius of a base of the recess is less than an outer radius of the ring magnet and greater than an inner radius of the ring magnet, the radius of the base of the recess to be measured from a center axis of the ring magnet to the base of the recess.

9. The ring magnet of claim 1, where the recess has an opening at the circumferential surface and a base inside the circumferential surface.

10. The ring magnet of claim 1, where the recess comprises a non-magnetic material.

11. The ring magnet of claim 1, where the recess comprises a gas.

12. A rotational angle detection system, comprising:
   a ring magnet for use in determining a rotational angle of a rotatable shaft, the ring magnet configured to be mounted on the rotatable shaft for co-rotation with the rotatable shaft around a rotational axis,
      where the ring magnet is configured to include a recess in a circumferential surface of the ring magnet, and
      where the recess is recessed away from the circumferential surface; and
   a magnetic sensor to measure the rotational angle of the rotatable shaft based on a measured ellipticity of a magnetic field of the ring magnet when measuring the rotational angle of the rotatable shaft,
      the measured ellipticity of the magnetic field of the ring magnet to remain substantially constant, due to the recess, as the ring magnet moves along the rotational axis of the rotatable shaft.

13. The rotational angle detection system of claim 12, where the circumferential surface is an inner circumferential surface of the ring magnet.

14. The rotational angle detection system of claim 12, where the circumferential surface is an outer circumferential surface of the ring magnet.

15. The rotational angle detection system of claim 12, where the recess has a rotationally uniform shape.

16. The rotational angle detection system of claim 12, where the recess includes a non-magnetic material.

17. A magnet arrangement to measure a rotational angle of a rotatable shaft, the magnet arrangement comprising:
   a first ring magnet with a first magnetization;
   a second ring magnet with a second magnetization,
      where the second magnetization is substantially a same magnetization as the first magnetization; and
   a frame component connected to or formed as a part of the rotatable shaft,
      where the frame component includes a swashplate situated between the first ring magnet and the second ring magnet,
         the swashplate in contact with an end face of the first ring magnet and an end face of the second ring magnet to form a recess in the magnet arrangement,
            where when a magnetic sensor measures an angle of rotation of the rotatable shaft, a constant ellipticity of a magnetic field, caused by the first magnetization and the second magnetization, is measured based on the recess.

18. The magnet arrangement of claim 17, where the frame component includes a radial bulge.

19. The magnet arrangement of claim 17, where the frame component comprises a non-magnetic material.

20. The magnet arrangement of claim 17, where radial dimensions of the first ring magnet are substantially a same as radial dimensions of the second ring magnet.

* * * * *